April 10, 1951  G. DUEFRENE  2,548,004
SEPARABLE FASTENER
Filed Feb. 2, 1944
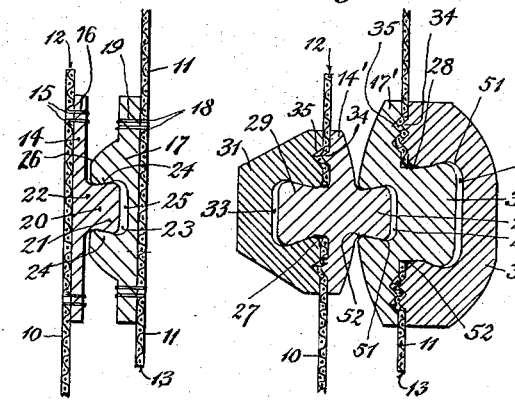
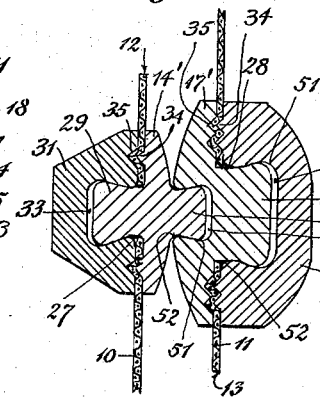
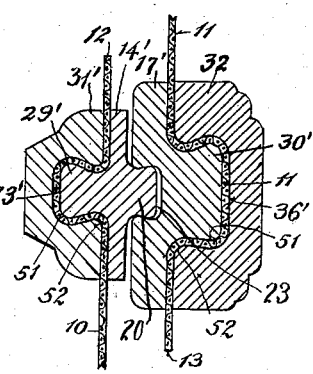
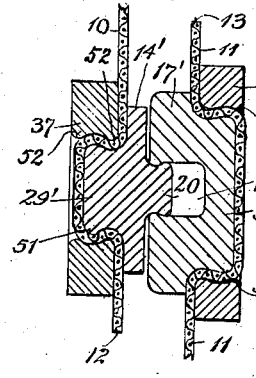
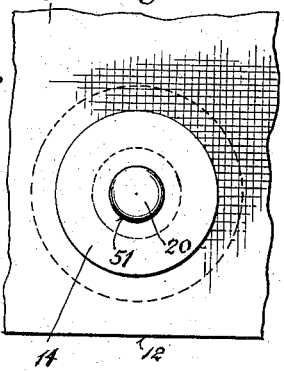
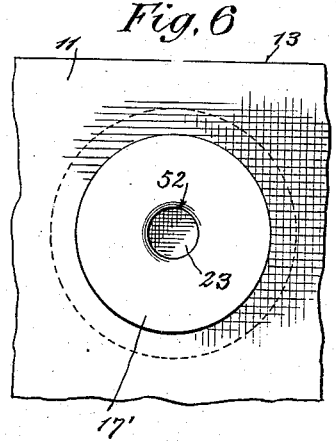
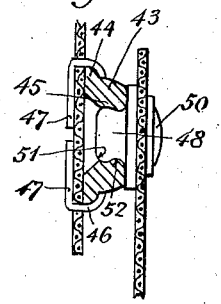
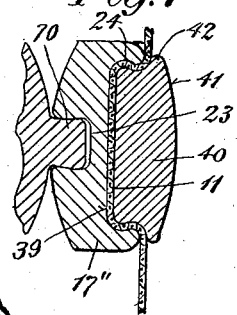
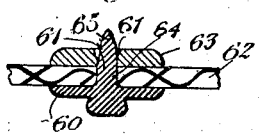
INVENTOR
George Duefrene
BY
Johnson + Kline
ATTORNEYS

Patented Apr. 10, 1951

2,548,004

UNITED STATES PATENT OFFICE 2,548,004

SEPARABLE FASTENER

George Duefrene, Stepney, Conn.

Application February 2, 1944, Serial No. 520,732

10 Claims. (Cl. 24—208)

This invention relates to separable fasteners of the type having cooperating plug and socket parts adapted to be readily united and separated with a snap action.

Heretofore, such fasteners generally have been made of metal, and in order to provide a detent action between the separable parts it was customary to slit the head or plug member so that it could contract on entering the socket and expand when in the socket to be held therein against casual removal. In some instances, the head has been made unslit, that is to say, solid, and the socket has been provided with weakened portions permitting it to yield to pass and yieldably hold the head. In other cases, extra springs have been provided in the socket to engage and hold the head.

Snap fasteners of this kind have usually been sewn or riveted to the overlapping portions of material to be held together, for instance at the margins of a placket or other opening, or on the flap and body of a pocketbook, or the overlapping edges of a glove.

An object of this invention is to provide a separable fastener in which the separable parts are made of such material and are so formed that the head and socket snap together due to the inherent distortability of the material of which the parts are made. This is accomplished, according to the present invention, by making the parts of hard plastic moldable material such as cellulose acetate for example, and forming the head as a bulbous projection and the socket with a constricted entrance portion.

In the broader aspects of the present invention, either the head or the socket or both may be arranged to distort or yield to permit the head to pass into the socket, but experience has shown that the best results are often obtained by making the socket in such form that it may do the greater part of the yielding when the head is inserted into it, since being on the outer side of the head it is free to yield outwardly bodily.

The molded snap fastener of the present invention may be economically made in rather large sizes, and therefore may be used as a substitute for buttons on garments and wearing apparel, especially in place of ornamental or trimming buttons.

In many situations it is desirable to have the separable parts of the fastener themselves attachable to and detachable from the supporting material. For instance, when laundering or dry cleaning garments, it is desirable to remove buttons, etc., especially when they are made rather large for ornamental purposes. According to the present invention, this is done in a simple and economical way by causing each of the separable members of the fastener itself to be made up of two separable pieces which may be snapped together with the supporting material between them. Each of these pieces may be made of molded plastic material, and one of the pieces may have a bulbous projection or head, while the piece to be applied on the other side of the supporting material may have a cooperating socket to receive the projection.

In the broader aspects of the invention, the material may be provided with an aperture through which the head extends into the socket of the other piece, or the coacting surfaces of the head and socket may be provided with sufficient clearance between them to permit the supporting material, for instance the fabric of the garment, to be interposed between them.

Thus, according to the present invention, if it is desired to remove the fastener from the parts of a garment, it is merely necessary to separate the piece of which each member is composed. In the case of the embodiment where the material is interposed between the pieces of the member, the location of the snap fastener may be changed without damaging the fabric by simply separating the two pieces of the member which is to be moved and reunite them with the material clamped between them at their new location.

In one form of the invention, the socket is constituted by an annulus or ring, and where it is important to save weight or material this construction is preferable. It is also preferable, for ornamental reasons, for the ring-shaped socket may be made of material of one color while the head on the cooperating piece be made of material of another color, and by such different or contrasting colors give a pleasing ornamental appearance. This construction also lends itself to advantageous use for ornamental purposes where the fabric is not perforated, for here the fabric will show as a disk within the annulus forming the socket member.

The separable fastener of this invention may be used in many different situations and circumstances. For instance, the male or plug member may be made of unyielding material such as metal, and the female or socket member may be made in the form of an annulus secured in any suitable manner to the supporting material.

Other features and advantages will hereinafter appear.

In the accompanying drawings which show several forms of this invention—

Figure 1 is a vertical section showing a sew-on type snap fastener made in accordance with the present invention.

Fig. 2 is a view of a snap fastener made according to the present invention in which the cooperating members of the fastener are themselves snapped together through perforations in the fabric.

Fig. 3 is a similar view, but showing the form of the invention in which the supporting fabric is interposed between the pieces making up the cooperating members of the device.

Fig. 4 is a view similar to Fig. 3, but showing the outer pieces made in the form of rings or annuli.

Fig. 5 is a face view of the head-carrying member of the device of Fig. 4 showing it attached to a supporting fabric.

Fig. 6 is a similar view, but showing a socket-carrying member.

Fig. 7 is a sectional view of another form of the invention in which one of the pieces has sockets on opposite sides of a button-like body.

Fig. 8 is a transverse sectional view showing another form of this invention in which the socket member is in the form of an annulus which may be suitably anchored to one supporting member, while the head, which may be made of metal or any other suitable material, is secured to the other supporting member.

Fig. 9 is a sectional view showing a modified form of this invention in which the two pieces making up one of the members may be permanently secured together with the intervening supporting material by thermoplastically joining the two pieces.

Fig. 10 is a sectional view of the complete fastener, a part of which is shown in Fig. 9, the piece of each member being secured together against separation and the members being separably joined.

The separable fastener of the present invention may be employed wherever two relatively movable structures are to be fastened together, and the forms of the invention herein disclosed are particularly adapted for fastening together such things as overlapping portions of articles of clothing, or flaps on receptacles, or curtains to movable supports.

In Figs. 1 to 8 inclusive, the devices of the present invention are illustrated as fastening together a fabric strip 10 and another fabric strip 11, and for this purpose the parts of the device are secured more or less close to the overlapping edges 12 and 13 of the fabrics. In the simplest form of the invention shown in Fig. 1, the fastener of the present invention comprises a button-like body 14 adapted to be sewed to the fabric 10 by stitching 15 through apertures 16, and another button-like body 17 adapted to be similarly sewed to the fabric 11 by stitching 18 through apertures 19.

As shown, the member 14 has a head 20 which has an enlarged portion 21 and a narrower portion 22, while the member 17 has a socket 23 which has a constricted entrance portion 24 and an enlarged inner portion 25, the head 20 being adapted to be received by the socket 23.

According to the present invention in the form at present preferred, the parts 14 and 17 are made of moldable plastic material such as a cellulose acetate composition commercially known as "Tenite," or other hard but slightly yielding resilient material. When made of such material, I have found that when the head 20 is placed over the cavity 23 and the members are pressed together, the entrance opening 24 of the cavity will so dilate and the head 20 so attenuate that the bulbous or enlarged portion 21 of the head will enter the cavity with a snap action. Then the contraction of the entrance 24 of the cavity and expansion of the bulbous portion 21 of the head causes the two parts to be held together firmly and securely against casual separation, thus fastening together the supporting materials to which the parts 14 and 17 are connected. The amount of force required to join the member 14 to the member 17 depends upon the degree of distortability of the material of which the parts are made as well as upon the shape of the parts, and it should be noted that in the broader aspects of this invention the distortion may occur in equal amounts in the head and the socket, or in greater amounts in either of these parts, or entirely in one or the other of the parts. For instance, in the form of the invention shown in Fig. 1, the greater part of the distortion would occur in the member 17, although some of the distortion would occur in the head 20.

Notwithstanding the fact that the head 20 is tightly and securely held in the socket 23, it may readily be removed therefrom by pulling the members apart or by tilting one member relative to the other, in which case the button-like body 14 will fulcrum on the projecting portion 26 of the body 17, causing the head to be pulled out from the socket.

It will be observed that the head 20 and socket 23 are not slit or weakened in any way as would be necessary if the parts were made of metal, in which latter case portions of the parts would yield. The present invention is, therefore, distinguished from such metal fasteners in that the socket and head each have continued surfaces and that the passage of the head into and from the socket is permitted solely by the inherent distorability of the material of which the part or parts are made. The fastener of the present invention is advantageous over previously proposed soft rubber buttons and buttonholes, since with these it is necessary to actually stretch the material of the buttonhole in order to permit the button to enter the same, and they cannot be united due to their softness by simply pressing the two together as can the members of the snap fastener of the present invention.

In the form of the invention shown in Fig. 2, there is shown the further improvement above referred to—namely, the provision of means for separably fastening the members of the snap fastener to the supporting structures. As shown in this figure, the fabrics 10 and 11 are provided with apertures 27 and 28, and the button-like members 14' and 17', instead of being fastened to the fabrics 10 and 11 by stitching, have heads 29 and 30 which extend through the apertures 27 and 28 respectively, and are engaged by socket members 31 and 32 respectively. Thus, the fastener illustrated in Fig. 2 comprises two members, each of which comprises two pieces which may be removably united. The piece 14', in the form of the invention shown in Fig. 2, is provided with a bulbous head 20 fitting in a socket 23, as described in connection with Fig. 1, to separably connect the fabrics 10 and 11. The head 29 is likewise bulbous and fits into a correspondingly shaped socket 33 in the socket member 31. When the head 29 is pressed into the socket 33, the fabric 10 is clamped between the pieces 14' and 31 and thus the parts of the member are held together and to the fabric. Companion ribs 34 and grooves 35 in the pieces 14' and 31 grip the fabric and prevent enlargement of the aperture 27 which would permit the fabric to be pulled out from between the pieces. The bulbous head 30 in this form of the invention fits into a corresponding socket 36 in the part 32, and when the pieces 17' and 32 are snapped together they are united along with the fabric 11. Here, also, the corresponding ribs 34 and grooves 35 prevent the fabric from being pulled out from between the parts 17' and 32.

One of the advantages of the device as constructed in Fig. 2 is that it permits the easy removal of the snap fastener parts from the supporting structures. This is particularly advantageous when the fastener is used on a garment which is to be washed or otherwise cleaned and pressed, for, by removing the buttons before laundering, the damage to the buttons in the process is avoided.

In making the fastener of this invention as illustrated in Fig. 2, the parts are so proportioned and shaped that a greater force is required to connect and separate the heads 29 and 30 from their respective sockets 33 and 36 than is required to connect and separate the head 20 from the socket 23. This is done so that when a pulling force is applied to the fabrics 10 and 11, the separation between the pieces will occur between the pieces 14' and 17', leaving the pieces 14' and 31 united to the fabric 10 and the pieces 17' and 32 united to the fabric 11.

The form of the invention shown in Fig. 3 is essentially the same as that shown in Fig. 2. In this form of the invention, however, the head 30' and the socket 36' are made under and oversize by an amount sufficient to permit the fabric 11 to be interposed between the head and the socket and to be clamped thereby and therebetween. With this construction, the parts 17' and 32 may be separated to remove them from the fabric, and since it was not necessary to perforate the fabric, in order that the head 30' might pass through it, the parts 17' and 32 may be fastened on the fabric at a place different from that at which they were originally fastened. Thus, it is possible to move the fasteners as one would move a button to tighten or loosen the garment. Likewise, the head 29' and socket 33' may be under and oversize respectively to permit the fabric 10 to be clamped by and between them. When this is done, the pieces 14' and 31' may be separated and may be replaced on the fabric closer to or farther from the edge 12, as desired.

Thus, with the device of the invention shown in Fig. 3, the change in overlapping of the fabrics 10 and 11 may be accomplished by moving either one or both of the members of the fastened to or from the edges of the materials.

According to the present invention, the outside or showing pieces of the fastener may be given any desired shape or contour for ornamental purposes. Thus, in Figs. 2 and 3, the pieces 32 may be ornamental as well as useful.

In the forms of the invention shown in Figs. 2 and 3, the socket members have closed ends, and thus completely cover the heads 29, 29', 30 and 30'. However, if desired, the ends of the socket members may be left open as shown in Fig. 4, in which case the socket-carrying portion assumes the shape of an annulus or ring 37—38. When the socket and head are shaped to take between them the fabric or material 10 and 11 as in Fig. 3 and the socket is in the form of an annulus, the fabric 11 will be exposed to view as a disk within the annulus, and thus imparts a pleasing ornamental effect to the fastener pieces. The annulus sockets 37 and 38 have the additional advantage of being more easily distortable when entered by the bulbous heads 29'' and 30'', and thus the pieces may be more easily assembled.

A further modification of this invention is shown in Fig. 7. As shown in this figure, the inner piece 17'' of one of the members may have a socket 23 as in the other figures, and also another socket 39 on the opposite face of the button-like body rather than heads as shown in Figs. 2, 3 and 4, and the material 11 may be separably anchored to the piece 17'' by being interposed between a disk 40 and the walls of the socket. As in the other forms of the invention, the socket has a restricted entrance opening 24 and the disk is rounded so that when the disk is placed over the socket 39 with the material 11 between it and the parts are pressed together, the material of the socket will distort and permit the fabric and disk to enter the socket and be locked therein. With this construction, only the disk will be exposed to view on the exterior of the garment, and if desired it may be formed integral with a cylindrical body portion 41 having an overhanging flange 42 overlying the margin of the depressed portion of the fabric by means of which the disk may be withdrawn from the socket when it is desired to remove or change the fastener. The other member of the fastener may be attached to the fabric or material in any of the other ways previously described, or it may be fastened by means of a disk such as the disk 40.

Instead of fastening the members 14 and 17 to the fabric 10 and 11 by sewing as in Fig. 1, they may be secured to their counterparts in any suitable way. For instance, as shown in Fig. 8, the socket may comprise an annular member 43 having a flange 44 by means of which it may be held to the supporting material 45 by a shell 46 having tangs 47 which may pierce the material and be bent over on opposite sides of the material. The head 48 in this form of the invention may be made of metal for example, and may be fastened to the supporting material 49 by a rivet or peened-over head 50.

As shown in the accompanying drawings, the bulbous heads or projections have on their outer ends chamfered or rounded portions 51 cooperating with similarly shaped portions 52 at the entrance openings of the recesses in order to permit the head to enter and distort the socket members.

In the form of the invention shown in Fig. 4, both the inner and outer marginal edges of the socket are so chamfered so that the annulus may be placed with either face toward the head when assembling the pieces to avoid the necessity of selecting one of the faces to be placed against the head.

As shown in Fig. 9, the two pieces making up one of the members of the fastener may be permanently secured together. For this purpose, the button-like member 60 is provided with a pin 61, preferably pointed so as to pierce the fabric or other material 62 to which the member is attached, with the button-like portion 60 against one surface of the material. A washer-like member 63 is then placed over the pin 61 and pressed down tightly. For the purpose of holding the washer 63 in position, the diameter of the aperture 64 in the washer and of the pin 61 are such as to make a tight fit. When the device is made in this form, it may be made of thermoplastic material so that when the parts are pressed together, heat may be applied to the projecting end 65 and cause the material to weld together. If this is done with a heated die having a suitable cavity, the surplus material may form a head 66 as shown in Fig. 10. If no head is desired, the end of the pin 61 may be cut off flush with the outside of the washer 63, which, being also made of thermoplastic material, will flow together and weld with the pin upon the application of heat to the pin and the margin of the hole.

In the broader aspects of this invention, it is not, of course, necessary to apply heat in order to fasten the two pieces together. Instead, a solvent may be used, as, for instance, acetone, to cause the pin 61 and washer 63 to cement together when the material is made of cellulose acetate. Other adhesives for other plastic compositions, the use of which is well known in the art, may be employed.

The fastening of the pieces together, as above described in connection with Fig. 9, may be performed for either or both members of the separable connection. As shown in Fig. 10, both members 67 and 68 are so made. The separable connection 69 may be the same as in the other figures.

Variations and modifications may be made within the scope of this invention and portions of the improvements may be used without others.

I claim:

1. A separable fastener comprising two members, one having a solid continuous bulbous head and the other a socket having a continuous solid wall to receive it, the socket being formed by a cavity having a constricted entrance opening to resists passage of the head into and out of the cavity, said head and socket being made of molded plastic, hard, resilient material which yields to temporary bodily deformation to permit the forced passage of the bulbous head into the cavity and snaps back and resiliently holds the same therein against casual separation.

2. A separable fastener comprising two members, one having a solid continuous bulbous head and the other a socket having a continuous solid wall to receive it, the socket being formed by a cavity having a constricted entrance opening to resist passage of the head into and out of the cavity, said head and socket being made of molded cellulose acetate which yields to temporary bodily deformation to permit the forced passage of the bulbous head into the cavity and snaps back and resiliently holds the same therein against casual separation.

3. A separable fastener comprising two members, one having a solid continuous bulbous head and the other a socket having a continuous solid wall to receive it, the socket being formed by a cavity having a constricted entrance opening to resist passage of the head into and out of the cavity, said socket being made of molded plastic, hard, resilient material so that the constricted entrance opening yieldingly dilates to permit the forced passage of the bulbous head into the cavity and contracts to snap back and resiliently hold the same therein against casual separation.

4. A separable fastener comprising two members, one having a solid continuous bulbous head and the other a socket having a continuous solid wall to receive it, the socket being formed by a cavity having a constricted entrance opening to resist passage of the head into and out of the cavity, said head being made of molded plastic, hard, resilient material so that the head yieldingly attenuates to permit the forced passage of the bulbous head into the cavity and then swells to snap back and resiliently hold the same therein against casual separation.

5. A separable fastener comprising two members, one having a solid continuous bulbous head and the other a socket having a continuous solid wall to receive it, the socket being formed by a cavity having a constricted entrance opening to resist passage of the head into and out of the cavity, said head and socket being made of molded plastic, hard, resilient material so that the head yieldingly attenuates and the entrance opening yieldingly dilates to permit forced passage of the bulbous head into the cavity and respectively swells and contracts to resiliently hold the head in the socket against casual separation.

6. The invention as defined in claim 1 in which the socket member is in the form of an annulus.

7. A separable fastener comprising two members, one having a solid continuous bulbous head and the other a socket having a continuous solid wall to receive it, the socket being formed by a cavity having a constricted entrance opening to resist passage of the head into and out of the cavity, said head and socket being made of molded plastic, hard, resilient material which yields to temporary bodily deformation to permit the forced passage of the bulbous head into the cavity and snaps back and resiliently holds the same therein against casual separation, each of said members comprising two pieces, one having a cooperating bulbous head and the other having a continuous solid wall to receive it with a snap action when the two pieces are placed on opposite sides of the supporting material and pressed together.

8. The invention defined in claim 7 wherein the supporting material extends over the bulbous head and the piece having the socket is on the outer side of the member and is provided with an opening through which the interposed material extending over the head may be exposed to view.

9. The invention as defined in claim 7 wherein the piece having the socket is button-shaped and located on the outer side of the member.

10. The invention defined in claim 7 wherein the cooperating socket grips the head on the pieces of each member with a stronger force than does the socket on the one member grip the head on the other member so that the latter connection separates upon application of pulling force on the supporting material without causing separation of the pieces on each side of the supporting material.

GEORGE DUEFRENE.

REFERENCES CITED

The following references are of record in the file of this patent:

UNITED STATES PATENTS

| Number | Name | Date |
| --- | --- | --- |
| 1,541,936 | Fife | June 16, 1925 |
| 1,682,771 | Butler | Sept. 4, 1928 |
| 1,773,422 | Caplan | Aug. 19, 1930 |
| 2,111,664 | Gross | Mar. 22, 1938 |
| 2,179,032 | Carley | Nov. 7, 1939 |
| 2,210,799 | Denny | Aug. 6, 1940 |

FOREIGN PATENTS

| Number | Country | Date |
| --- | --- | --- |
| 14,696 | Great Britain | Nov. 30, 1885 |
| 22,848 | Great Britain | Nov. 7, 1905 |
| 600,997 | Germany | Aug. 6, 1934 |